United States Patent [19]

Wieder

[11] 4,257,395
[45] Mar. 24, 1981

[54] FLUID FLOW CONTROLLER

[76] Inventor: Solomon Wieder, 17 Blueberry Hill Rd., Monsey, N.Y. 10952

[21] Appl. No.: 23,649

[22] Filed: Mar. 26, 1979

[51] Int. Cl.³ .................. F24J 3/02; G05D 23/00; F04B 49/10
[52] U.S. Cl. ..................... 126/422; 126/432; 126/437; 165/32; 165/120; 417/32
[58] Field of Search ............. 126/422, 432, 437; 417/32; 165/32, 120

[56] References Cited

U.S. PATENT DOCUMENTS

| | | | |
|---|---|---|---|
| 3,787,882 | 1/1974 | Fillmore et al. | 417/32 |
| 3,986,489 | 10/1976 | Schlesinger | 126/422 |
| 3,998,207 | 12/1976 | Watt | 126/432 |
| 4,019,495 | 4/1977 | Frazier | 126/422 |
| 4,034,738 | 7/1977 | Barber | 126/422 |
| 4,060,195 | 11/1977 | Rapp et al. | 126/422 |
| 4,062,349 | 12/1977 | Birnbreier | 126/432 |
| 4,063,545 | 12/1977 | Hapgood | 126/437 |
| 4,109,639 | 8/1978 | Keegan | 126/422 |
| 4,116,219 | 9/1978 | Nurnberg | 126/422 |
| 4,125,107 | 11/1978 | Nurnberg | 126/422 |

OTHER PUBLICATIONS

Hawthorn Product Information, H-1510-B, "Variflow Control", 2 pages.

Primary Examiner—James C. Yeung
Assistant Examiner—Daniel O'Connor
Attorney, Agent, or Firm—Hubbell, Cohen, Stiefel & Gross

[57] ABSTRACT

A controller for a system of the type including a variable temperature heat source arranged in heat exchange relation with a fluid circulating circuit, and a variable speed pump disposed in said circuit for varying the flow rate of fluid therethrough in response to variations in the temperature of the fluid. The controller includes a probe for sensing a temperature indicative of the temperature of the fluid in the circuit and for generating a first signal indicative thereof; means for generating a reference signal indicative of a predetermined temperature; means for comparing the first two signals and generating a third signal indicative of the difference therebetween; means responsive to the third signal for generating an analog control signal; means responsive to the analog control signal for varying the pump speed as a function of the control signal for equalizing the first and second signals.

13 Claims, 6 Drawing Figures

FLUID FLOW CONTROLLER

BACKGROUND OF THE INVENTION

1. Field of the Invention

This invention pertains to flow controllers and more particularly to analog flow controllers for varying the circulation rate of a fluid in heat exchange relation with a variable temperature heat source such as, for example, a solar collector.

2. Statement of the Prior Art

The use of solar collectors in space heating and hot water systems is well known as are control systems for regulating the temperature of the circulated fluid, typically water. The control systems, which usually regulate a pump interposed in the fluid circulating circuit, fall into two main categories: on-off controllers and proportional controllers.

On-off regulators employ a temperature sensor disposed to sense the temperature of the water at some point in the system, typically at the output of the collector. The signal from the sensor is sent to a pump controller which deactivates the pump whenever the sensed temperature drops below a reference temperature and activates the pump whenever the sensed temperature exceeds the reference temperature. The reference temperature may be directly dependent on some system parameter, such as the storage water temperature, or may be a fixed value independent of system parameters. Examples of typical on-off regulators may be found in U.S. Pat. Nos. 3,998,207, 4,062,349, 4,019,495, 4,034,738 and 4,063,545.

Regardless of the reference signal selected, on-off controllers result in excessive strain on the pump motor due to constant activation and deactivation thereof. Perhaps more importantly, on-off controllers cannot accurately regulate the temperature of the water leaving the collector due to the time lags inherent in a system which varies the flow rate of the water between zero and some fixed rate. Accordingly, such systems are accompanied by relatively wide fluctuations in the collector water temperature. In most applications, this results in reduced efficiency of the solar heating system. For example, where the solar heating system is used as a hot water heater, it is desirable to keep the temperature at the output of the collector at or near a predetermined value. If the temperature is below the predetermined value, the temperature gradient between the collector water and the storage water may be too low with the result that no heat will be available from the solar heater. On the other hand, if the temperature gradient between the collector water and the storage water is too high, excessive heat is lost to the atmosphere. In either case, the result is reduced efficiency.

Proportional controllers operate on the principle that the flow rate of the collector water through the system is proportional to the temperature of the collector water or some temperature difference, for example, the temperature difference between the water at the output of the collector and the storage water temperature. The proportionality constant is determined by the particular system parameters. Unlike on-off controllers, the signal from the proportional controller is utilized to vary the pump speed and hence the flow rate of the water circulated through the collector. Because this virtually eliminates system cycling, strain on the pump motor is reduced. However, although they are an improvement, proportional controllers, like on-off controllers, cannot maintain a fixed temperature at the collector output. For example, when the collector temperature drops due to a change in ambient conditions, the proportional controller will reduce the pump speed and hence the flow rate in an effort to raise the collector temperature. However, because proportional controllers operate on a pre-set proportional relationship between flow rate and temperature, the new set point established by the proportional controller corresponds to a different temperature than the original temperature at the higher flow rate. It is thus apparent that the collector water temperature in a system regulated by a proportional controller is partially dependent on ambient conditions. Exemplary proportional controllers are described in Hawthorne Industries, Inc.'s Product Information Bulletins for their Model Nos. H-1511-A and H-1510-B.

It is therefore apparent that prior art controllers for regulating the flow rate of fluid through a solar heating system are incapable of maintaining a fixed, predetermined fluid temperature at the output of the collector.

SUMMARY OF THE INVENTION

According to the invention, I have developed a controller for maintaining a predetermined temperature at a predetermined location in a fluid circulating circuit arranged in heat exchange relation with a variable temperature heat source, such as a solar collector. According to the invention, the controller regulates the speed of a pump disposed in the fluid circulating circuit thereby varying the flow rate of the fluid, typically water, during heat exchange with the heat source.

In the preferred embodiment of the controller according to the present invention, a temperature sensing and amplifying circuit senses the temperature at the predetermined location in the fluid circulating circuit and generates a first signal indicative of the sensed temperature. A differential amplifying circuit compares this signal with a second signal indicative of the desired temperature and generates a third signal indicative of the difference between the sensed temperature and the reference temperature. This signal is then applied to a ramp circuit which generates an increasing analog signal whenever the reference temperature exceeds the sensed temperature and a decreasing analog signal whenever the reference temperature is less than the sensed temperature. The analog signal at the output of the ramp circuit is applied to a pump speed regulating circuit which varies the speed of the pump in the fluid circulating circuit as a function of the amplitude of the analog signal. The analog control signal will continuously increase or decrease as the case may be until the change in the pump speed equalizes the sensed temperature with the reference temperature. At this point, the amplitude of the control signal and the pump speed will remain constant until the sensed temperature again deviates from the reference temperature. Preferably, the controller operates the pump to maintain a minimum speed even when the analog control signal drops to zero, thus eliminating surges which accompany pump cycling.

The controller according to the invention may be modified to maintain a pre-set temperature difference. For example, when the controller is incorporated in a solar heating system for heating water, with the heated water being stored in a tank, the controller may be used to maintain a pre-set temperature difference between the temperature of the water at the output of the collector and the temperature of the water in the tank.

Further features and advantages of the controller according to the present invention will become more fully apparent from the following detailed description and annexed drawings of a preferred embodiment thereof.

DETAILED DESCRIPTION OF THE PREFERRED EMBODIMENT

Figure 1:
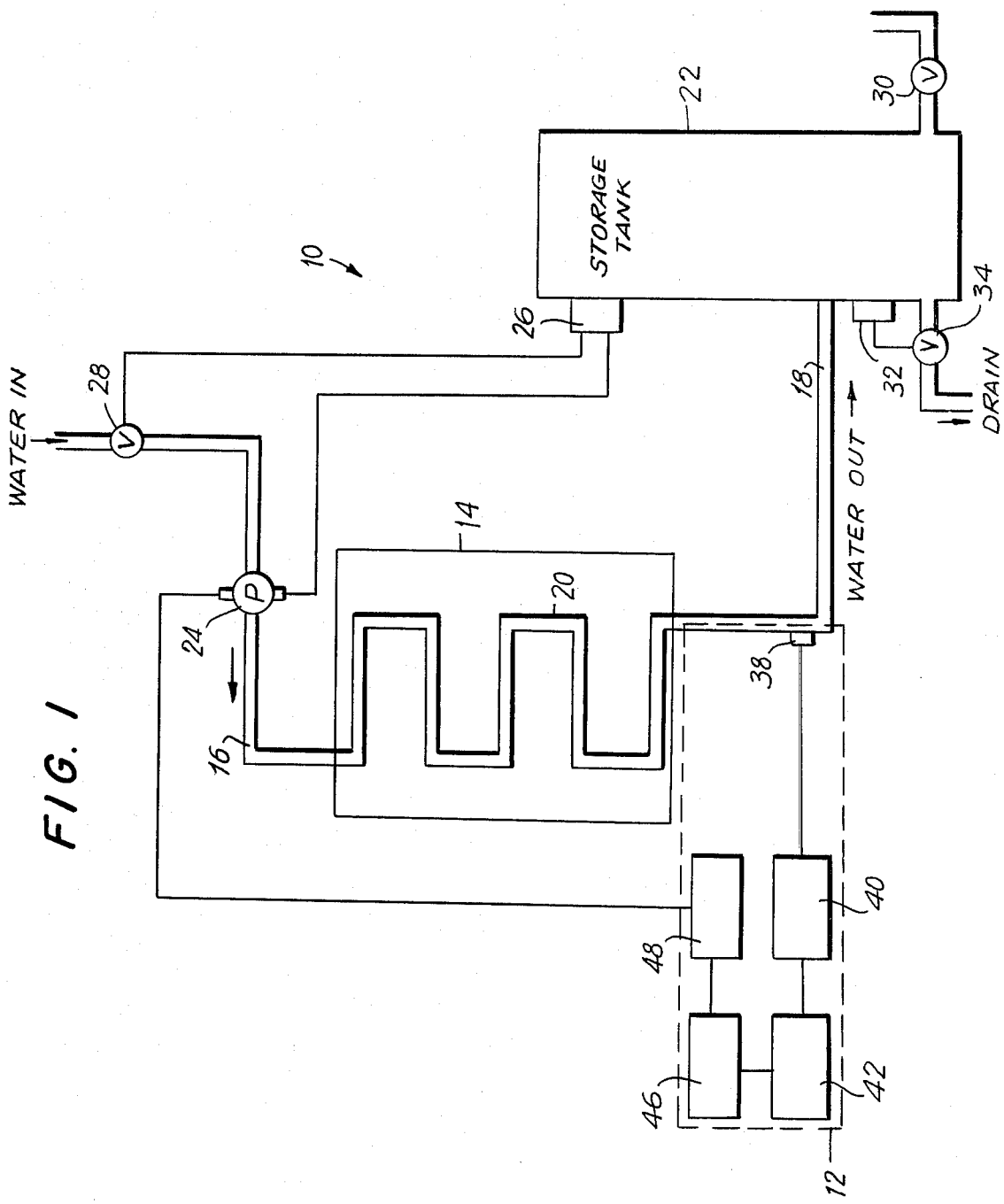
FIG. 1 is a diagrammatic illustration of the preferred controller according to the present invention incorporated in a solar heating system.

Referring now to the drawings and initially to FIG. 1 thereof, a solar heating system 10 incorporating the preferred controller 12 according to the present invention is shown. In addition to the controller 12, the system 10 includes a collector 14, a fluid circulating circuit comprised of inlet pipe 16, outlet pipe 18 and a connecting pipe 20 serpentined through the collector 14, and a tank 22 for storing the heated fluid, typically water, leaving the collector 14 through the pipe 18. A motorized variable speed pump 24 is interposed in the fluid circulating circuit, preferably in the pipe 16. A water level sensor 26 disposed on the tank 22 is connected to a valve 28 for discontinuing the flow of water through the collector when the storage tank is full. The sensor 26 is also connected to the pump 24 for deactivating the pump whenever the valve 28 is closed. The system 10 also includes a valve 30 for regulating the flow of water out of the tank 22 and a temperature sensor 32 connected to a valve 34 which opens to drain water from the tank 22 whenever the temperature of the storage water drops below a predetermined level.

Apart from the controller 12, which is described in greater detail below, the elements of the system 10 are conventional and form no part of the present invention. In fact, it will be apparent as this description progresses that the controller 12 according to the present invention may be used in conjunction with any system of the type wherein a fluid circulating system is arranged in heat exchange relation with a variable temperature heat source. Accordingly, incorporation of the controller 12 in the solar heating system 10 should be recognized as being for purposes of illustration only.

As shown in FIG. 1, the principal components of the controller 12 are a temperature sensor or probe 38, a signal amplifier circuit 40 for amplifying the signal from the sensor 38, a differential amplifier circuit 42 for generating a signal indicative of the difference between the temperature sensed by the sensor 38 and a predetermined temperature, a ramp circuit 46 whose analog output varies in response to changes in the output from the differential amplifier circuit 42, and a pump speed control circuit 48 for varying the speed of the pump 24 as a function of the output from the ramp circuit 46.

Figure 2:
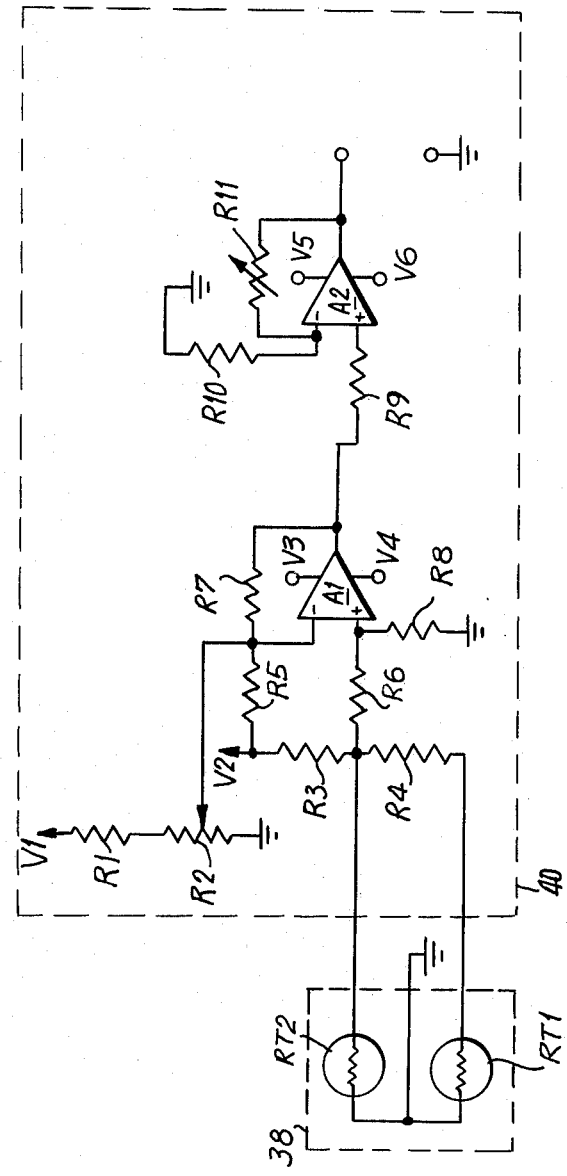
FIG. 2 is a schematic representation of the preferred temperature sensing and amplifying circuit of the preferred controller.
Figure 4:
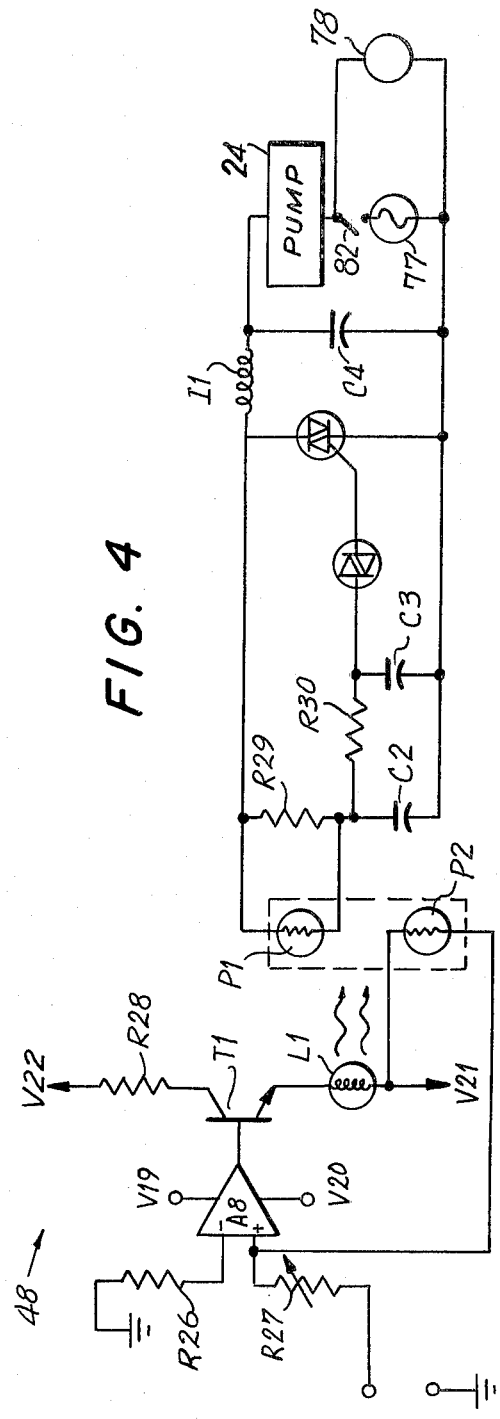
FIG. 4 is a schematic representation of the preferred pump speed regulator circuit of the preferred controller.
Figure 3:
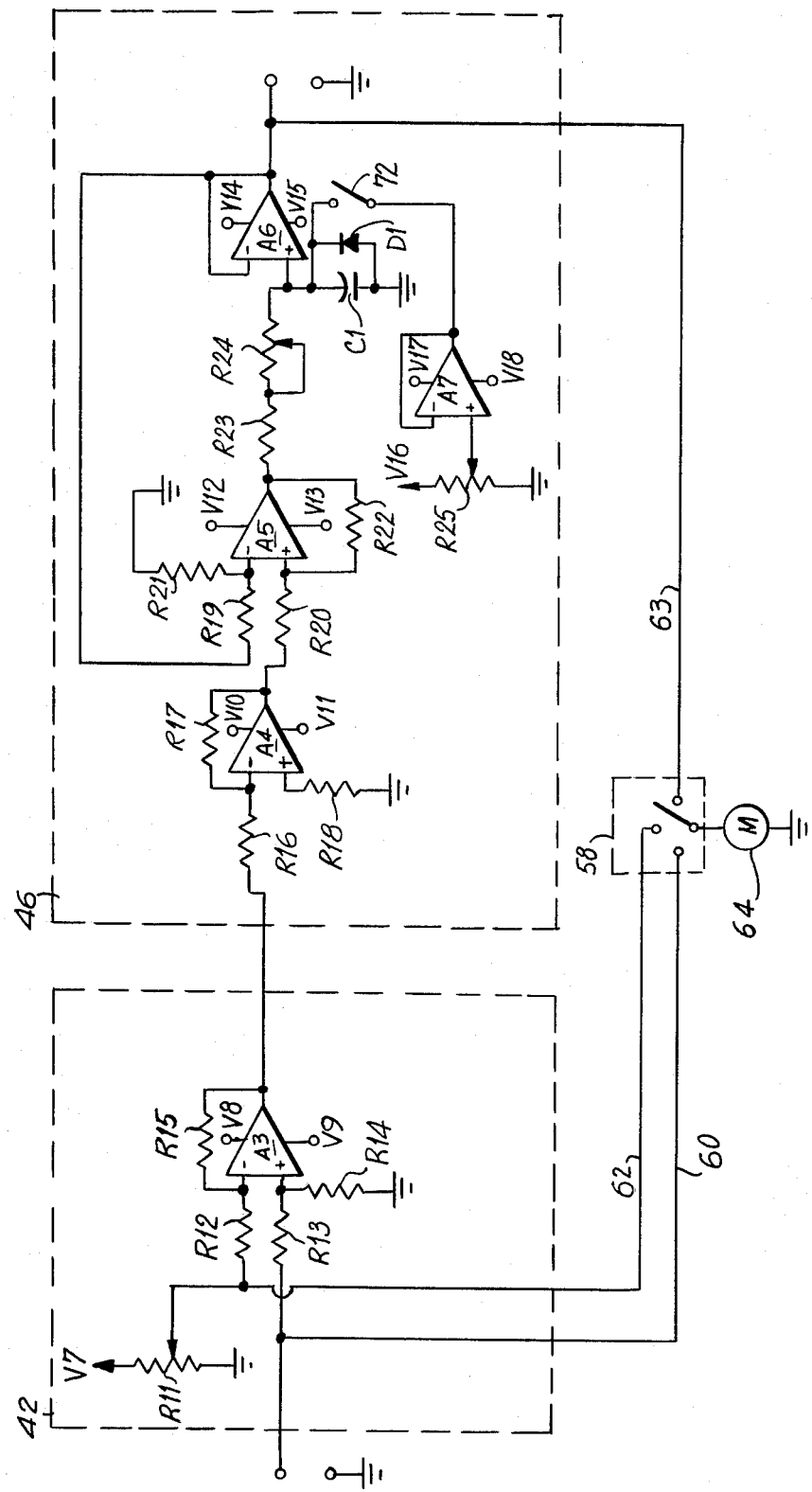
FIG. 3 is a schematic representation of the preferred differential amplifier circuit and the preferred ramp circuit of the preferred controller.

Referring now to FIGS. 2–4, the preferred components 38, 40, 42, 46 and 48 of the controller 12 according to the present invention are illustrated. Referring first to FIG. 2, the preferred temperature sensor 38 is a composite probe comprised of thermistors RT1 and RT2. While a single thermistor probe could be used, the dual probe of FIG. 2 is preferred because it provides a linear response to changes in sensed temperature. The output of the probe 38 is applied to the signal amplifying circuit 40 comprising operational amplifiers A1 and A2. It will be apparent to those skilled in the art that the circuit 40 amplifies the signal from the probe 38 and provides an output signal which is proportional to the temperature sensed by the sensor 38.

Referring next to FIG. 3, the output from the amplifying circuit 40 is applied to the differential amplifier circuit 42. As shown, the signal from the circuit 40 is applied to the positive input of the operational amplifier A3. The inverting input of the amplifier A3 receives an adjustable reference voltage signal from the potentiometer R11 which is pre-set to correspond to the water temperature desired at the output of the collector 14. This will be more fully understood hereinafter. The output from the amplifier A3, which is equal to the difference between the signals applied to its positive and inverting inputs, is positive if the temperature sensed by the probe 38 is greater than the pre-set temperature and negative if the sensed temperature is less than the pre-set temperature. When the sensed temperature equals the pre-set temperature, the output from the amplifier A3 is zero. For reasons that will be more fully understood hereinafter, the output signal from the amplifying circuit 40 and the reference signal from the potentiometer R11 are applied to two poles of a three-way switch 58 by the wires 60 and 62, respectively. As shown, the switch 58 is connected to a voltmeter 64.

The output from the differential amplifier 42 is applied to the ramp circuit 46. As shown in FIG. 3, the preferred ramp circuit 46 comprises an operational amplifier operating as an inverting unity gain amplifier A4 and an inverting integrator comprised of the operational amplifiers A5 and A6. It will be apparent to those skilled in the art that the ouput of the ramp circuit 46 is an analog signal having a slope proportional to the input signal from the differential amplifier circuit 42. Thus, the output signal from the circuit 46 increases whenever the input signal from the differential amplifier circuit 42 is positive and decreases whenever the output signal from the circuit 42 is negative. Whenever the output signal from the differential amplifier circuit 42 is zero, the analog output signal from the ramp circuit 46 remains constant. It will be apparent that the ramp rate for a given output signal from the circuit 42 is determined by the resistors R23 and R24 and the capacitor C1. As presently preferred and shown, the resistor R24 is a variable resistor whereby the ramp rate may be varied. The reason for this will be more fully understood hereinafter. The diode D1 is a clamping diode which prevents the output from the ramp circuit 46 from becoming negative. For reasons explained below, as presently preferred and shown, the positive input to the amplifier A6 is connected through a switch 72 to a sub-circuit comprised of a potentiometer R25 connected to the positive input of an operational amplifier A7 operating as a unity gain buffer. Also for reasons explained hereinafter, the output of the ramp circuit 46 is connected to the third pole of the three-way switch 58 by the wire 63.

Referring now to FIG. 4, the output from the ramp circuit 46 is applied to the input of the preferred pump speed regulator circuit 48. The circuit 48 utilizes a triac gate-firing circuit to vary the rms AC voltage applied to the pump 24 in response to variations in the DC voltage at the output of the ramp circuit 46. It will be apparent to those skilled in the art that the triac gate-firing circuit illustrated in FIG. 4 is a more or less conventional circuit of the type employed in light dimmer circuits. Because of the low voltage ratings of the components in the ramp circuit 46 as compared with the AC voltage required to drive the pump 24, the circuit 48 must include means for effecting signal isolation. While this may be accomplished in a variety of different ways, as presently preferred and shown, the energy from the DC signal at the output of the ramp circuit 46 is converted to light energy by the lamp L1 which impinges on and varies the resistance of the photocell P1 in the triac gate-firing circuit. As shown, the lamp L1 is driven by a current booster comprising the transistor T1. The variable resistor R27 is used to adjust the brightness of the lamp such that the maximum brightness of the lamp corresponds to the maximum pump speed. The resistance of the photocell P1, which varies inversely to the voltage output from the ramp circuit 46, serves as the control resistor in the triac gate-firing circuit. As shown, the photocell P1 is preferably one of two photocells in a dual element "pancake" photocell, the other photocell P2 being connected in the feedback loop to the base of the transistor T1 through the buffer amplifier A8. The result is that the resistance of the photocell P1 is inversely proportional to the output voltage from the circuit 46. The variable resistor R29 connected in parallel across the photocell P1 serves as a "creep" adjustment which prevents the pump 24 from shutting off when the output from the ramp circuit 46 reaches zero. This could happen if ambient conditions preclude the collector water temperature from reaching the preset temperature. The circuit 48 also includes a switch 82 for connecting the pump 24 to an AC power source 77 and a pilot light 78 for indicating when the switch 82 is closed.

Figure 5A:
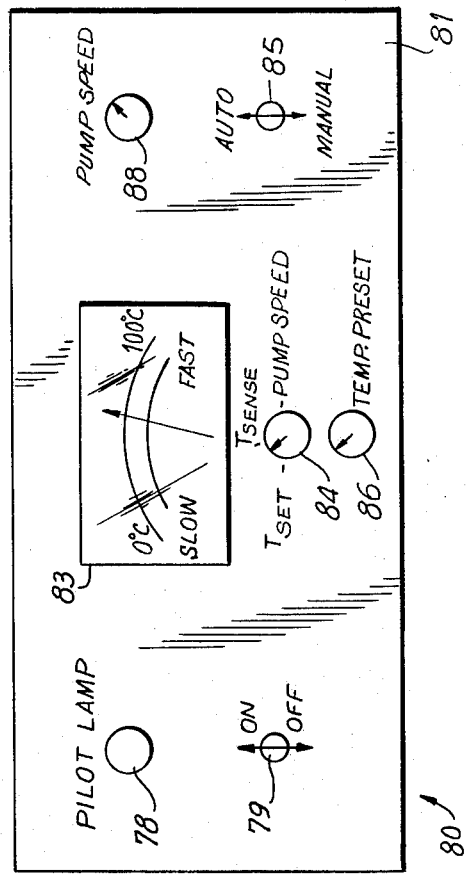
FIG. 5A is a front elevation of the preferred housing for the preferred controller of the present invention.
Figure 5B:
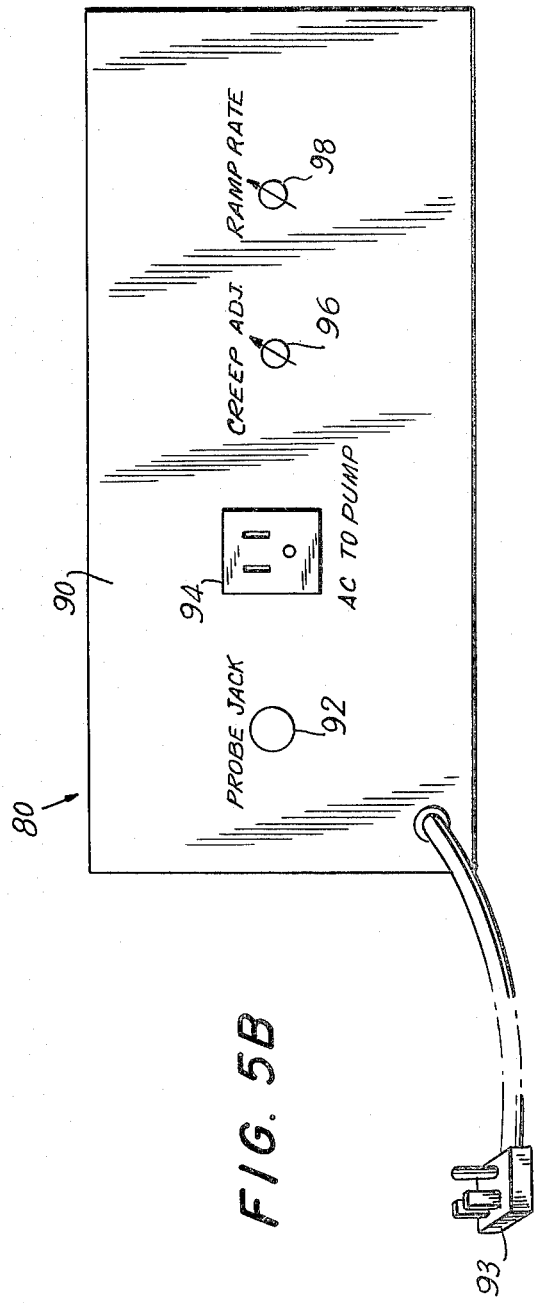
FIG. 5B is a rear elevation of the preferred housing.

Referring now to FIGS. 5A and 5B, except for the temperature sensor 38 and the AC power source 77, the elements of the controller 12 are preferably housed in a control box 80. The front panel 81 of the box 80 preferably includes a lever 79 for controlling the switch 82, the pilot light 78, the face 83 of the voltmeter 64, a knob 84 for rotating the three-way switch 58, a second lever 85 for controlling the switch 72, and knobs 86 and 88 for adjusting the variable resistors R11 and R25, respectively. The rear panel 90 of the housing 80 preferably includes a connector 92 for the sensor 38, a male plug 94 for the AC power source 77, a female plug 94 for connecting the AC power source 77 to the pump 24 through the switch 82, and screw adjustments 96 and 98 for the variable resistors R29 and R24, respectively.

Suitable components and values for the circuits of FIGS. 2–4 are as follows:

RESISTORS

R1, R9, R10: 10,000 ohms
R2: 0–1,000 ohms
R3: 3,200 ohms
R4: 6,250 ohms
R5, R6, R7, R8, R12, R13, R14, R15, R16, R17, R18, R19, R20, R21, R22: 100,000 ohms
R11: 0–10,000 ohms
R23: 5,000 ohms
R24: 0–25,000 ohms
R25: 0–10,000 ohms
R26: 1,000 ohms
R27: 0–5,000 ohms
R28: 100 ohms
R29: 0–500,000 ohms
R30: 15,000 ohms

CAPACITORS

C1: 1,000 uf
C2, C3, C4: 0.1 uf

INDUCTORS

I1: 100 uh

OPERATIONAL AMPLIFIERS

A1, A2, A3, A4, A5, A6, A7, A8: $\frac{1}{2}$ National Semiconductor ua 747

VOLTAGES

V1, V3, V5, V7, V8, V10, V12, V14, V16, V17, V19, V21: +15 volts
V2: +1.5 volts
V4, V6, V9, V11, V13, V15, V18, V20, V22: −15 volts

TEMPERATURE SENSOR composite thermistor probe: Yellow Springs Instruments YSI 44201; RT1, 6,000 ohms, 25° C.; RT2, 30,000 ohms, 25° C.

PHOTOCELLS

P1, P2: type 415 photocells

OTHER

Voltmeter: 0–15 V

To prepare the controller 12 for use, the temperature sensor 38 is preferably connected to the pipe 18 near the collector 14 for sensing the temperature of the water as it leaves the collector. While this location for the probe 38 is preferred, it will be apparent to those skilled in the art that other locations may be employed such as, for example, at the inlet port to the storage tank 22. In fact, for the particular application of FIG. 1, it is only necessary that the sensor 38 be disposed to sense a temperature indicative of the temperature of the water leaving the collector 14. The probe 38 is then connected to the box 80 via the connector 92 and the plugs 93 and 94 connected to the AC power source 77 and pump 24, respectively.

At this point, the controller 12 is activated by moving the lever 79 to the ON position thereby closing the switch 82 (FIG. 4). The knob 84 for the three-way switch 58 is then rotated to the T SET position thereby connecting the meter 64 to the line 62 (FIG. 3). The desired water temperature at the output of the collector is then pre-set by manipulating the knob control 86 for the resistor R11 (FIG. 3) until the desired temperature is indicated on the meter 64. With the lever 85 in the AUTO position, which corresponds to the switch 72 being open, the knob 84 is rotated to the PUMP SPEED position thereby connecting the meter 64 via the line 63 to the output of the ramp circuit 46 (FIG. 3). The lower scale on the meter 64 is now set to read the amplitude of the signal at the output of the ramp circuit 46 which signal is proportional to the speed of the pump 24. With an eye on the meter 64, the screw pot 98 is adjusted to avoid oscillations and overshoots as the ramp signal levels off indicating that the collector water temperature is approaching the pre-set temperature. A series of adjustments may be made by using the lever 79 to turn off the pump 24 between adjustments. The lever 85 is now moved to the MANUAL position which corresponds to the switch 72 being closed (FIG. 3). With the switch 72 closed, the output of the circuit 46 is controlled by the variable resistor R25. With the knob 84 still in the PUMP SPEED position, the knob 88 which varies the resistor R25 is rotated until the output from the ramp circuit 46 is reduced to zero as indicated on the face 83 of the meter 64. Through measurement by instrumentation or by simply listening to the pump 24, the creep adjustment is then set by rotating the screw pot 96 until the desired minimum pump speed is obtained. As indicated previously, this prevents the pump from cycling off when the output of the ramp circuit 46 drops to zero. The knob 88 is next rotated until the meter 64 indicates that the output from the circuit 46 is at its maximum. The resistor R27 is adjusted until the maximum pump speed is reached. Again, the maximum pump speed may be detected by measurement or by listening to the pump. This adjustment sets the maximum pump speed to correspond to the maximum output signal from the ramp circuit 46. The adjustment for the resistor R27 is preferably inside the box 80. It could, for example, be a screw adjustment. At this point, the lever 85 is returned to the AUTO position and the knob 84 is rotated to the T SENSED position which corresponds to the meter 64 being connected to the line 60 (FIG. 3). In this position, the upper scale of the meter face 83 indicates the water temperature at the output of the collector 14 as sensed by the probe 38. By continuously varying the speed of the pump 24 in response to changes in ambient conditions, the controller 12 will now automatically maintain the temperature of the water at the output of the collector 14 at the pre-set temperature.

For example, assume that the temperature of the collector water sensed by the probe 38 drops below the preset temperature due to a change in ambient conditions. This results in a negative voltage signal at the output of the difference amplifier circuit 42. When this signal is applied to the ramp circuit 46, the analog output from the ramp circuit 46 begins to decrease from the constant value it maintained as long as the collector water temperature and sensed temperature were equal. Application of the decreasing signal from the ramp circuit 46 to the pump speed regulator circuit 48 decreases the voltage applied across the lamp L1 and hence the light energy transmitted to the photocells P1 and P2. As previously indicated, the resistance of the photocell P1 varies inversely with the light energy transmitted by the lamp L1. Thus, as the voltage applied across the lamp L1 decreases, the resistance of the photocell P1 increases thereby decreasing the speed of the pump 24. This slows the flow of water through the collector 14 thereby increasing the water temperature at the output of the collector. As the collector water temperature again approaches the pre-set temperature, the analog signal at the output of the ramp circuit 46 will start to level off until the sensed temperature equals the collector water temperature at which point the amplitude of the output signal from the ramp circuit stabilizes at a constant value, thus stabilizing the speed of the pump 24. At this new, slower speed of the pump 24, the sensed temperature will once again be equal to the pre-set temperature. In the event the sensed temperature rises above the pre-set temperature, the output of the difference amplifier circuit will be positive thereby causing the analog signal at the output of the ramp circuit 46 to increase. When applied to the pump speed regulator circuit 48, this will decrease the resistance of the photocell P1 thereby increasing the speed of the pump 24. The result is an increase in the rate of flow of water through the collector and a decrease in the temperature of the water at the output of the collector. Once the sensed temperature again equals the pre-set temperature, the analog signal at the output of the ramp circuit 46 will level off and the speed of the pump 24 will remain constant.

Referring again to FIG. 2, the variable resistors R2 and R11 are used to calibrate the signal amplifying circuit 40 to yield accurate temperature readings on the meter face 83. This is accomplished by rotating the knob 84 to the T SENSED position thus connecting the meter 64 to the output of the circuit 40. The probe 38 is then exposed to 0° C. whereupon the resistor R2 is adjusted until the needle on the meter face 83 reads 0° C. The probe 38 is next exposed to a temperature of 100° C. and the resistor R11 adjusted until the needle reads 100° C. This completes the temperature calibration procedure. It is intended that these adjustments be made by the manufacturer prior to sale of the controller 12. Accordingly, the resistors R2 and R11 are preferably adjusted by screw pots located inside the housing 80.

As an option, the controller 12 can be operated manually to obtain any desired temperature. To do this, the lever 85 is moved to the MANUAL position and the knob 84 rotated to the T SENSED position. As indicated previously, the output of the ramp circuit 46 is now dependent on the position of the knob 88 which adjusts the resistor R25. Thus, any desired temperature at the output of the collector 14 may be set by rotating the knob 88 to vary the output of the ramp circuit 46 and hence the pump rate until the desired temperature is indicated on the meter face 83. This temperature may then be set as the reference temperature by rotating the knob 84 to the T SET position and setting the reference temperature with the knob 86. If the controller is then returned to the AUTO mode, the reference temperature will be automatically maintained as is more fully described above.

Those skilled in the art will appreciate that the preferred embodiment of the present invention illustrated in FIGS. 1-5 may be modified in several respects without departing from the spirit and scope of the invention. For example, while the output from the ramp circuit 46 (FIG. 3) is designed to level off when the signal from the differential amplifier circuit 42 drops to zero, thus indicating that the desired temperature has been achieved, the circuit 46 could be designed to level off the output signal when a predetermined tolerance between the pre-set temperature and the actual temperature has been reached. Also, while the slope of the ramp generated by the circuit 46 changes in response to variations in the amplitude of the signal from the differential amplifier circuit 42, this is not necessary. For example, one alternative is a circuit wherein the ramp increases (decreases) with a constant slope in response to a positive (negative) output from the differential amplifier circuit 42. It will thus be appreciated that while the circuit 46 (FIG. 3) is described hereinabove as a ramp circuit, it does not generate a true ramp in the sense of an analog signal having a constant slope. Accordingly, the term ramp as used herein should be understood to include any variable analog signal, regardless of slope.

It will also be appreciated that while the controller 12 is designed to maintain a pre-set temperature, it could also be designed to maintain a pre-set temperature difference such as a pre-set difference between the water temperature at the output of the collector 14 and the water temperature in the storage tank 22. This could be accomplished, for example, by incorporating an additional probe 38 and amplifying circuit 40 into the unit 12. The additional probe 38 and circuit 40 would be utilized to sense and amplify the temperature signal at the second location. The output signals from the two amplifying circuits 40 could then be fed into an additional differential amplifier which would generate a signal indicative of the difference between the two temperatures. This signal would then be fed into the differential amplifier circuit 42 with the resistor R11 being adjusted to the desired temperature difference. The remainder of the circuit 12 would remain the same.

Since these as well as additional changes and modifications are intended to be within the scope of the present invention, the above described should be construed as illustrative and not in a limiting sense, the scope of the invention being defined by the following claims:

I claim:

1. A controller for a solar heating system of the type including a collector arranged in heat exchange relation with a fluid circulating circuit, and a pump having a variable pump rate for varying the flow rate of said fluid through said fluid circuit in response to variations in the temperature of said fluid, said controller comprising:

means for sensing a temperature indicative of the temperature of said fluid in said fluid circuit and for generating a first signal indicative thereof;

means for generating a second signal indicative of a predetermined temperature;

means for comparing said first and second signals and for generating a third signal indicative of the difference therebetween;

means responsive to said third signal for generating an analog control signal, said analog control signal increasing when said third signal indicates that one of said first and second signals exceeds the other of said first and second signals, decreasing when said third signal indicates that said other signal exceeds said one signal, and remaining constant when said third signal indicates that said first and second signals are equal;

means responsive to said analog control signal for varying said pump rate as a function of said control signal for equalizing said first and second signals, said pump rate increasing when said analog control signal is in one of said increasing or decreasing modes, decreasing when said analog control signal is in the other of said increasing or decreasing modes, and remaining unchanged when said analog control signal is constant; and biasing means for establishing a minimum pump rate when said pump is activated.

2. The controller according to claim 1, wherein said temperature sensing means comprises means for sensing the temperature of said fluid at a predetermined location in said fluid circuit.

3. The controller according to claim 2, wherein said predetermined location is adjacent the output of said collector.

4. The controller according to claim 1, wherein said temperature sensing means comprises means for sensing the temperature of said fluid at two spaced apart predetermined locations in said fluid circuit; and wherein said first signal is indicative of the difference in fluid temperature at said two locations.

5. The controller according to claim 1, wherein said analog control signal decreases when said third signal indicates that said second signal exceeds said first signal and increases when said third signal indicates that said first signal exceeds said second signal.

6. The controller according to claim 5, wherein said pump rate varying means increases said pump rate in response to an increase in said analog signal and decreases said pump rate in response to a decrease in said analog signal.

7. The controller according to claim 1, and further comprising switch means for activating and deactivating said pump.

8. The controller according to claim 1, wherein the slope of said analog signal is a function of the difference between said first and second signals.

9. The controller according to claim 8, wherein said third signal is proportional to the difference between said first and second signals and wherein said slope is proportional to said third signal.

10. The controller according to claim 9, wherein said pump rate varying means varies said pump rate in proportion to said analog signal.

11. The controller according to claim 9, and further comprising means for adjusting said slope.

12. The controller according to claim 1, wherein the slope of said analog signal in said increasing and decreasing modes is fixed.

13. The controller according to claim 1, wherein said second signal generating means includes means for varying said predetermined temperature.

* * * * *